United States Patent
Inada

(10) Patent No.: US 11,548,987 B2
(45) Date of Patent: Jan. 10, 2023

(54) METHOD FOR PRODUCING RUBBER WET MASTERBATCH AND METHOD FOR PRODUCING RUBBER COMPOSITION

(71) Applicant: Toyo Tire Corporation, Itami (JP)

(72) Inventor: Yonosuke Inada, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 222 days.

(21) Appl. No.: 17/153,290

(22) Filed: Jan. 20, 2021

(65) Prior Publication Data
US 2021/0230380 A1 Jul. 29, 2021

(30) Foreign Application Priority Data
Jan. 27, 2020 (JP) .............................. JP2020-010605

(51) Int. Cl.
*C08J 3/215* (2006.01)
*C08J 3/22* (2006.01)
*C08K 3/04* (2006.01)

(52) U.S. Cl.
CPC .................. *C08J 3/215* (2013.01); *C08J 3/22* (2013.01); *C08K 3/04* (2013.01); *C08J 2307/02* (2013.01); *C08K 2201/014* (2013.01)

(58) Field of Classification Search
CPC .......... C08J 3/22; C08J 3/215; C08J 2307/02; C08K 3/04; C08K 2201/014
See application file for complete search history.

(56) References Cited

U.S. PATENT DOCUMENTS 11,459,428 B2 * 10/2022 Inada ........................ C08L 7/02
2017/0073477 A1 3/2017 Nishiura et al.

FOREIGN PATENT DOCUMENTS

| JP | 2015-214625 A | 12/2015 |
| JP | 2016-222765 A | 12/2016 |
| JP | 2017-95569 A | 6/2017 |

* cited by examiner

*Primary Examiner* — Edward J Cain
(74) *Attorney, Agent, or Firm* — WHDA, LLP

(57) ABSTRACT

A method for producing a rubber wet masterbatch includes mixing a rubber latex solution and a coagulant with a carbon black-containing slurry aqueous solution in which a carbon black is dispersed in water, to produce a carbon black-containing rubber latex aqueous solution having a pH of 7 to 8.5; adding additional coagulant to the carbon black-containing rubber latex aqueous solution obtained to produce a carbon black-containing rubber coagulum; and dehydrating and drying the carbon black-containing rubber coagulum obtained to produce a rubber wet masterbatch, wherein a rubber component contained in the rubber latex solution is added at an addition rate of 10 g/min or more and 100 g/min or less and the part of the coagulant is added at an addition rate of 10 mmol/min or more and 100 mmol/min or less per 100 g of the carbon black contained in the carbon black-containing slurry aqueous solution.

2 Claims, No Drawings

METHOD FOR PRODUCING RUBBER WET MASTERBATCH AND METHOD FOR PRODUCING RUBBER COMPOSITION

BACKGROUND OF THE INVENTION

Field of the Invention

The present invention relates to a method for producing a rubber wet masterbatch and a method for producing a rubber composition.

Description of the Related Art

It has been conventionally known in the rubber industry that a rubber wet masterbatch is used for improvement in the processability during the production of a rubber composition containing a carbon black and the dispersibility of a carbon black. In this method, a carbon black is mixed with a dispersion solvent in advance at a certain ratio and dispersed in the dispersion solvent by a mechanical force to obtain a carbon black-containing slurry solution, the carbon black-containing slurry solution is mixed with a rubber latex solution in a liquid phase, then, a coagulant such as an acid is added to obtain a coagulum (carbon black-containing rubber coagulum), and the coagulum is collected and dried (for example, Patent Documents 1 to 3).

In the case of using a rubber wet masterbatch, the dispersibility of the carbon black is more excellent and the obtained rubber composition is more excellent in rubber physical properties such as processability and a reinforcing property than in the case of using a rubber dry masterbatch obtained by mixing a carbon black and rubber in a solid phase. By using such a rubber composition as a raw material, it is possible to produce a rubber product (vulcanized rubber) such as a pneumatic tire having reduced rolling resistance and excellent fatigue resistance.

PRIOR ART DOCUMENT

Patent Document

Patent Document 1: JP-A-2017-95569
Patent Document 2: JP-A-2016-222765
Patent Document 3: JP-A-2015-214625

SUMMARY OF THE INVENTION

In the market, tires (vulcanized rubber) in which a rubber composition is used as a raw material need to be further low exothermic and to have abrasion resistance.

The present invention has been made in view of the above-described circumstances, and provides a method for producing a rubber wet masterbatch with which vulcanized rubber having excellent low exothermicity and excellent abrasion resistance is obtained.

The present invention relates to a method for producing a rubber wet masterbatch, the method including: a step (I) of mixing a rubber latex solution and a part of a coagulant with a carbon black-containing slurry aqueous solution in which a carbon black is dispersed in water, while the rubber latex solution and the part of the coagulant are added to the carbon black-containing slurry aqueous solution, to produce a carbon black-containing rubber latex aqueous solution having a pH of 7 or more and 8.5 or less; a step (II) of adding a remaining part of the coagulant to the carbon black-containing rubber latex aqueous solution obtained to produce a carbon black-containing rubber coagulum; and a step (III) of dehydrating and drying the carbon black-containing rubber coagulum obtained to produce a rubber wet masterbatch, wherein in the step (I), a rubber component contained in the rubber latex solution is added at an addition rate of 10 g/min or more and 100 g/min or less and the part of the coagulant is added at an addition rate of 10 mmol/min or more and 100 mmol/min or less per 100 g of the carbon black contained in the carbon black-containing slurry aqueous solution.

Furthermore, the present invention relates to a method for producing a rubber composition, the method including a step (IV) of dry mixing in which the rubber wet masterbatch obtained by the method for producing a rubber wet masterbatch is used.

Regarding the action mechanism of the effect in the method for producing a rubber wet masterbatch according to the present invention, some of the details are unknown and presumed as follows. However, the present invention does not need to be interpreted as being limited to this action mechanism.

The method for producing a rubber wet masterbatch according to the present invention includes: a step (I) of mixing a rubber latex solution and a part of a coagulant with a carbon black-containing slurry aqueous solution in which a carbon black is dispersed in water, while the rubber latex solution and the part of the coagulant are added to the carbon black-containing slurry aqueous solution, to produce a carbon black-containing rubber latex aqueous solution having a pH of 7 or more and 8.5 or less; a step (II) of adding a remaining part of the coagulant to the carbon black-containing rubber latex aqueous solution obtained to produce a carbon black-containing rubber coagulum; and a step (III) of dehydrating and drying the carbon black-containing rubber coagulum obtained to produce a rubber wet masterbatch, wherein in the step (I), a rubber component contained in the rubber latex solution is added at an addition rate of 10 g/min or more and 100 g/min or less and the part of the coagulant is added at an addition rate of 10 mmol/min or more and 100 mmol/min or less per 100 g of the carbon black contained in the carbon black-containing slurry aqueous solution. An ordinary method of mixing a carbon black-containing slurry aqueous solution and a rubber latex solution, such as the method in the above-described Patent Documents, is known in which one of the solutions is put (dropped) into the other solution while the other solution is stirred, and then a coagulant is added (also referred to as conventional method). In such a conventional method, because continuous dropping of one solution causes change in pH in the obtained mixed solution over time, the sizes of the carbon blacks to which rubber latex particles generated during the mixing are adhered are non-uniform. Furthermore, the addition of the coagulant at an uncontrolled addition rate leads to sudden coagulation. As a result, the size of the coagulum (solid crumb) cannot be controlled. In the method for producing a rubber wet masterbatch according to the present invention, the size of the coagulum (solid crumb) can be controlled to a certain size because the formation of the coagulum (solid crumb) can be gradually promoted by employing the above-described steps. Therefore, it is presumed that the low exothermicity and the abrasion resistance are exhibited in a good balance in vulcanized rubber in which the rubber wet masterbatch obtained by dehydrating and drying the rubber coagulum is used.

DETAILED DESCRIPTION OF THE PREFERRED EMBODIMENTS

<Method for Producing Rubber Wet Masterbatch>

The method for producing a rubber wet masterbatch according to the present invention includes: a step (I) of mixing a rubber latex solution and a part of a coagulant with a carbon black-containing slurry aqueous solution in which a carbon black is dispersed in water, while the rubber latex solution and the part of the coagulant are added to the carbon black-containing slurry aqueous solution, to produce a carbon black-containing rubber latex aqueous solution having a pH of 7 or more and 8.5 or less; a step (II) of adding a remaining part of the coagulant to the carbon black-containing rubber latex aqueous solution obtained to produce a carbon black-containing rubber coagulum; and a step (III) of dehydrating and drying the carbon black-containing rubber coagulum obtained to produce a rubber wet masterbatch.

<Step (I)>

In the step (I) of the present invention, a rubber latex solution and a part of a coagulant are mixed with a carbon black-containing slurry aqueous solution in which a carbon black is dispersed in water, while the rubber latex solution and the part of the coagulant are added to the carbon black-containing slurry aqueous solution, to produce a carbon black-containing rubber latex aqueous solution having a pH of 7 or more and 8.5 or less. In the step (I), a rubber component contained in the rubber latex solution is added at an addition rate of 10 g/min or more and 100 g/min or less and the part of the coagulant is added at an addition rate of 10 mmol/min or more and 100 mmol/min or less per 100 g of the carbon black contained in the carbon black-containing slurry aqueous solution.

<Carbon Black-Containing Slurry Aqueous Solution>

The carbon black-containing slurry aqueous solution is usually obtained by mixing a carbon black and water as raw materials.

As the carbon black, for example, a carbon black used in the ordinary rubber industry can be used, such as SAF, ISAF, HAF, FEF, or GPF. In addition, a conductive carbon black such as acetylene black or Ketjen black can be used. The carbon black may be a granulated carbon black granulated in consideration of its handleability in the ordinary rubber industry, or may be a non-granulated carbon black. The carbon blacks may be used singly or in combination of two or more kinds thereof.

The carbon black preferably has a specific surface area by nitrogen adsorption of about 30 $m^2/g$ or more and 250 $m^2/g$ or less, and more preferably about 50 $m^2/g$ or more and 200 $m^2/g$ or less.

The water is a medium containing water such as ion-exchanged water, distilled water, or industrial water as a main component, and may be, for example, water containing an organic solvent.

Examples of the method of mixing the carbon black and the water include a method of dispersing a carbon black using a general disperser such as a high shear mixer, a high shear mixer, a homomixer, a ball mill, a bead mill, a high-pressure homogenizer, an ultrasonic homogenizer, or a colloid mill. If necessary, the entire mixing system such as a disperser may be heated during mixing.

The term "high shear mixer" refers to a mixer having a rotor that is capable of high-speed rotation and a stator that is fixed. In the mixer, the rotation of the rotor with precise clearance between the rotor and the stator generates high shearing action. As such a high shear mixer, commercially available products can be used, such as "High Shear Mixer" manufactured by SILVERSON, "High Shear Mixer IKA 2000 Series" manufactured by IKA, "T.K. HOMO MIXER" manufactured by Tokushu Kika Kogyo Co., Ltd., "Ultra Homo Mixer" manufactured by MIZUHO INDUSTRIAL CO., LTD., "CLEARMIX" manufactured by M Technique Co., Ltd., and "CAVITRON" manufactured by Pacific Machinery & Engineering Co., Ltd.

The rate of the carbon black in the carbon black-containing slurry aqueous solution is preferably 1 to 20% by weight. The rate of the carbon black in the carbon black-containing slurry aqueous solution is more preferably 2% by weight or more, and still more preferably 5% by weight or more, from the viewpoint of enhancing the work efficiency of removing water in the step of dehydrating and drying. The rate of the carbon black in the carbon black-containing slurry aqueous solution is more preferably 15% by weight or less, and still more preferably 12% by weight or less, from the viewpoint of reducing the viscosity of the carbon black-containing slurry aqueous solution to enhance the stirring efficiency.

<Rubber Latex Solution>

As the rubber latex solution, a natural rubber latex solution and a synthetic rubber latex solution can be used.

The natural rubber latex solution is a natural product due to the metabolic action of a plant, and is particularly preferably a natural rubber/water-based solution containing water as a dispersion solvent. The number average molecular weight of the natural rubber contained in the natural rubber latex is preferably 2,000,000 or more, and more preferably 2,500,000 or more. In the natural rubber latex solution, latex such as concentrated latex and fresh latex called field latex can be used without distinction. Examples of the synthetic rubber latex solution include solutions produced by emulsion polymerization of styrene-butadiene rubber, butadiene rubber, nitrile rubber, and chloroprene rubber. The rubber latex solutions may be used singly or in combination of two or more kinds thereof.

The rate of the rubber component (solid content) in the rubber latex solution is preferably 15 to 35% by weight. The rate of the rubber component (solid content) in the rubber latex solution is more preferably 18% by weight or more, and still more preferably 20% by weight or more, from the viewpoint of the reactivity between the carbon black and the rubber content in the latex. The rate of the rubber component (solid content) in the rubber latex solution is more preferably 33% by weight or less, and still more preferably 30% by weight or less, from the viewpoint of preventing a decrease in stirring efficiency due to the high viscosity.

The content of the carbon black is preferably 10 to 120 parts by mass per 100 parts by mass of the rubber component in the rubber latex. The content of the carbon black is preferably 20 parts by mass or more, more preferably 30 parts by mass or more, and preferably 100 parts by mass or less, more preferably 80 parts by mass or less per 100 parts by mass of the rubber component in the rubber latex, from the viewpoint of improving the reinforcing property of the vulcanized rubber.

In the step (I), the rubber component contained in the rubber latex solution is added at an addition rate of 10 g/min or more and 100 g/min or less per 100 g of the carbon black contained in the carbon black-containing slurry aqueous solution. The addition rate of the rubber component contained in the rubber latex solution is preferably 80 g/min or less, and more preferably 60 g/min or less per 100 g of the carbon black contained in the carbon black-containing slurry aqueous solution from the viewpoint of improving the dispersion of the carbon black in the crosslinked rubber. Furthermore, the addition rate is preferably 15 g/min or more, more preferably 20 g/min or more, and still more preferably 30 g/min or more per 100 g of the carbon black contained in the carbon black-containing slurry aqueous solution from the viewpoints of improving the dispersion of the carbon black in the crosslinked rubber and enhancing the productivity.

As the coagulant, a coagulant usually used for coagulation of a rubber latex solution can be used. Examples of the coagulant include acids such as formic acid and sulfuric acid; and bases such as sodium chloride.

In the step (I), the part of the coagulant is added at an addition rate of 10 mmol/min or more and 100 mmol/min or less per 100 g of the carbon black contained in the carbon black-containing slurry aqueous solution. The addition rate of the part of the coagulant is preferably 80 mmol/min or less, and more preferably 70 mmol/min or less per 100 g of the carbon black contained in the carbon black-containing slurry aqueous solution from the viewpoint of improving the dispersion of the carbon black in the crosslinked rubber. Furthermore, the addition rate is preferably 15 mmol/min or more, more preferably 20 mmol/min or more, and still more preferably 30 mmol/min or more per 100 g of the carbon black contained in the carbon black-containing slurry aqueous solution from the viewpoints of improving the dispersion of the carbon black in the crosslinked rubber and enhancing the productivity. The addition rate of the part of the coagulant is a value calculated in terms of the coagulant (100%).

The blending amount (usage amount) of the part of the coagulant is not particularly limited as long as the pH of the obtained carbon black-containing rubber latex aqueous solution is 7 or more and 8.5 or less. For example, the blending amount is about 20% by mass or more and 60% by mass or less in the total of all the coagulants used in the step (I) and the step (II).

The carbon black-containing rubber latex aqueous solution has a pH of 7 or more and 8.5 or less. From the viewpoint of the reactivity between the carbon black and the rubber latex, the carbon black-containing rubber latex aqueous solution more preferably has a pH of 7.2 or more and still more preferably 7.5 or more. Furthermore, the carbon black-containing rubber latex aqueous solution more preferably has a pH of 8.3 or less.

<Step (II)>

In the step (II) of the present invention, the remaining part of the coagulant is added to the carbon black-containing rubber latex aqueous solution obtained above to produce a carbon black-containing rubber coagulum.

<Step (III)>

In the step (III) of the present invention, the carbon black-containing rubber coagulum obtained above is dehydrated and dried to produce a rubber wet masterbatch. In the method of dehydrating and drying, various dehydration/drying devices can be used, such as a single-screw extruder, a twin-screw extruder, an oven, a conveyor dryer, a vacuum dryer, and an air dryer. If necessary, prior to the step (III), a step may be provided, such as a centrifugation step or a solid-liquid separation step in which a vibration screen is used, for the purpose of appropriately reducing the amount of water contained in the carbon black-containing rubber coagulum, or a step may be provided, such as a cleaning step by a water washing method or the like, for the purpose of cleaning.

<Step (IV)>

The method for producing a rubber composition according to the present invention includes a step (IV) of dry mixing in which the rubber wet masterbatch obtained above is used.

In the step (IV), various compounding agents can be further used. For example, compounding agents for ordinary use in the rubber industry can be used, such as rubber, sulfur-based vulcanizing agents, vulcanization accelerators, anti-aging agents, silica, silane coupling agents, zinc oxide, methylene acceptors and methylene donors, stearic acid, vulcanization activators, vulcanization retarders, organic peroxides, softeners such as waxes and oils, and processing aids. If necessary, the various compounding agents can also be used for production of the rubber wet masterbatch.

The above-described rubber is used separately from the rubber component derived from the rubber wet masterbatch. Examples of the rubber include natural rubber (NR) and diene-based synthetic rubber such as isoprene rubber (IR), styrene-butadiene rubber (SBR), butadiene rubber (BR), chloroprene rubber (CR), and nitrile rubber (NBR). The rubber may be used singly or in combination of two or more kinds thereof.

The content of the carbon black is preferably 10 to 120 parts by mass per 100 parts by mass of the rubber component in the rubber composition. The content of the carbon black is preferably 20 parts by mass or more, more preferably 30 parts by mass or more, and preferably 100 parts by mass or less, more preferably 80 parts by mass or less per 100 parts by mass of the rubber component in the rubber composition, from the viewpoint of improving the reinforcing property of the vulcanized rubber.

The sulfur as the sulfur-based vulcanizing agent may be ordinary sulfur for rubber, and sulfur such as powdered sulfur, precipitated sulfur, insoluble sulfur, and highly dispersible sulfur can be used. The sulfur-based vulcanizing agents may be used singly or in combination of two or more kinds thereof.

The content of the sulfur is preferably 0.3 to 6.5 parts by mass per 100 parts by mass of the rubber component in the rubber composition. If the content of the sulfur is less than 0.3 parts by mass, the crosslink density of the vulcanized rubber is insufficient and the rubber strength or the like is deteriorated. If the content is more than 6.5 parts by mass, both the heat resistance and the durability are particularly deteriorated. In order to ensure good rubber strength of the vulcanized rubber and further improve the heat resistance and the durability, the content of the sulfur is preferably 1.0 to 5.5 parts by mass per 100 parts by mass of the rubber component in the rubber composition.

An ordinary vulcanization accelerator for rubber is sufficient as the vulcanization accelerator, and examples of the vulcanization accelerator include sulfenamide-based vulcanization accelerators, thiuram-based vulcanization accelerators, thiazole-based vulcanization accelerators, thiourea-based vulcanization accelerators, guanidine-based vulcanization accelerators, and dithiocarbamate-based vulcanization accelerators. The vulcanization accelerators may be used singly or in combination of two or more kinds thereof.

The content of the vulcanization accelerator is preferably 1 to 5 parts by mass per 100 parts by mass of the rubber component in the rubber composition.

An ordinary anti-aging agent for rubber is sufficient as the anti-aging agent, and examples of the anti-aging agent include aromatic amine-based anti-aging agents, amine-ketone-based anti-aging agents, monophenol-based anti-aging agents, bisphenol-based anti-aging agents, polyphenolbased anti-aging agents, dithiocarbamate-based anti-aging agents, and thiourea-based anti-aging agents. The anti-aging agents may be used singly or in combination of two or more kinds thereof.

The content of the anti-aging agent is preferably 1 to 5 parts by mass per 100 parts by mass of the rubber component in the rubber composition.

In the step (V), the method of blending (adding) the rubber wet masterbatch and the various compounding agents is, for example, a method of kneading with a kneader used in the ordinary rubber industry, such as a Banbury mixer, a kneader, or a roll.

The method of kneading is not particularly limited, and examples of the method include a method of adding and kneading components other than vulcanizing components such as sulfur-based vulcanizing agents and vulcanization accelerators in an arbitrary order, a method of adding and kneading components other than vulcanizing components simultaneously, and a method of adding and kneading all components simultaneously. The number of times of the kneading may be one or more. The kneading time depends on the size of the kneader used, and a time of about 2 to 5 minutes is usually sufficient as the kneading time. The discharge temperature of the kneader is preferably 120 to 170° C., and more preferably 120 to 150° C. In the case where the vulcanizing component is contained, the discharge temperature of the kneader is preferably 80 to 110° C., and more preferably 80 to 100° C.

According to the method for producing a rubber wet masterbatch or the method for producing a rubber composition of the present invention, vulcanized rubber having excellent low exothermicity and excellent abrasion resistance can be obtained. The rubber wet masterbatch and the rubber composition according to the present invention are suitable for a pneumatic tire.

EXAMPLES

The present invention is described below with reference to Examples, but the present invention is not limited to these Examples.
(Raw Materials Used)

a) Natural rubber latex solution: "NR Field Latex" (manufactured by Golden Hope Plantations Berhad) (DRC=31.2%)

b) Carbon black (A): "SEAST KH" (manufactured by TOKAI CARBON CO., LTD.)

c) Carbon black (B): "SEAST S" (manufactured by TOKAI CARBON CO., LTD.)

d) Carbon black (C): "SEAST 3" (manufactured by TOKAI CARBON CO., LTD.)

e) Carbon black (D): "SEAST SO" (manufactured by TOKAI CARBON CO., LTD.)

f) Zinc oxide: "Zinc Oxide Type 2" (manufactured by MITSUI MINING & SMELTING CO., LTD.)

g) Stearic acid: "LUNAC S20" (manufactured by Kao Corporation)

h) Anti-aging agent (A): "NOCRAC 6C" (manufactured by OUCHI SHINKO CHEMICAL INDUSTRIAL CO., LTD.)

i) Anti-aging agent (B): "NOCRAC 224" (manufactured by OUCHI SHINKO CHEMICAL INDUSTRIAL CO., LTD.)

j) Sulfur: "Fine Powder Sulfur with 5% Oil" (manufactured by Tsurumi Chemical Industry Co., ltd.)

k) Vulcanization accelerator (A): "SANCELER CM" (manufactured by SANSHIN CHEMICAL INDUSTRY CO., LTD.)

l) Vulcanization accelerator (B): "NOCCELER D" (manufactured by OUCHI SHINKO CHEMICAL INDUSTRIAL CO., LTD.)

Example 1

<Step (I): Production of Carbon Black-Containing Rubber Latex Aqueous Solution>

Water was added to the natural rubber latex solution "NR Field Latex" at room temperature to prepare a rubber latex solution having a concentration of 25% by weight. Separately, the carbon black (A) was added to water and dispersed in the water using "High Shear Mixer" manufactured by SILVERSON (conditions: 9,000 rpm, 30 minutes) to prepare a carbon black (A)-containing slurry aqueous solution having a carbon black concentration of 6% by weight. A carbon black (B)-containing slurry aqueous solution was prepared in the same manner as described above. Next, the same amount of the carbon black (A)-containing slurry aqueous solution and the carbon black (B)-containing slurry aqueous solution were mixed to prepare a carbon black-containing slurry aqueous solution, the rubber latex solution (25% by weight) was added to the carbon black-containing slurry aqueous solution at room temperature at an addition rate of 40 g/min per 100 g of the carbon black contained in the carbon black-containing slurry aqueous solution until the amount of the rubber component was 100 parts by mass per 40 parts by mass of the carbon black (20 parts by mass of the carbon black (A) and 20 parts by mass of the carbon black (B)), formic acid (10% solution) as a coagulant was added to the carbon black-containing slurry aqueous solution under the condition of an addition rate of 40 mmol/min per 100 g of the carbon black contained in the carbon black-containing slurry aqueous solution until the amount of the formic acid was 50% by mass in the total of all the coagulants used in the step (I) and the step (II), and the resulting mixture was stirred. Furthermore, the anti-aging agent (A) was added so as to be 3 parts by mass per 100 parts by mass of the rubber component, and the resulting mixture was stirred to produce a carbon black-containing rubber latex aqueous solution. The obtained carbon black-containing rubber latex aqueous solution had a pH of 7.7. The pH was measured using a "portable pH meter HM-30P" manufactured by DKK-TOA CORPORATION. The addition rate of the rubber latex solution shows the addition rate of the rubber component contained in the rubber latex solution, and the addition rate of the coagulant is a value calculated in terms of formic acid (100%).

<Step (II): Production of Carbon Black-Containing Rubber Coagulum>

Subsequently, while the carbon black-containing rubber latex aqueous solution produced in the step (II) (90° C.) was mixed using the household mixer SM-L56 manufactured by SANYO Electric Co., Ltd., formic acid (10% solution) was added as the remaining part of the coagulant until the whole solution had a pH of 4 to produce a carbon black-containing rubber coagulum. The size of the obtained carbon black-containing rubber coagulum was calculated by the following formula and found to be 30 mm.

Formula: size of carbon black-containing rubber coagulum (mm)=(R1×V1+R2×V2+ . . . +Rk×Vk) [Rk represents the equivalent circle diameter (mm) of each carbon black-containing rubber coagulum (mm); Vk represents the volume ratio (%) of the carbon black-containing rubber coagulum having each size.]

For example, in the case that a solid crumb is obtained in which the ratio of the coagulum having an equivalent circle diameter of 5 mm is 20 vol %, the ratio of 15 mm is 30 vol %, the ratio of 25 mm is 40 vol %, and the ratio of 35 mm is 10 vol %, the size of the solid crumb is 19 (mm) {=(5×20+15×30+25×40+35×10)/100)}.

<Step (III): Production of Rubber Wet Masterbatch>

The carbon black-containing rubber coagulum produced in the step (III) was dehydrated and dried with a squeezer type single-screw extrusion dehydrator (screw press No. V-02 manufactured by SUEHIRO EPM CORPORATION) to produce a rubber wet masterbatch.

<Step (IV): Production of Rubber Composition and Unvulcanized Rubber Composition>

The rubber wet masterbatch obtained above and raw materials shown in Table 1 (components other than the sulfur and the vulcanization accelerator) were dry-mixed using a Banbury mixer (kneading time: 3 minutes, discharge temperature: 150° C.) to produce a rubber composition. Next, the sulfur and the vulcanization accelerator shown in Table 1 were added to the obtained rubber composition, and the resulting mixture was dry-mixed using a Banbury mixer (kneading time: 1 minute, discharge temperature: 90° C.) to produce an unvulcanized rubber composition. The blending ratio in Table 1 is shown by the mass by part (phr) per 100 parts by mass of the total amount of the rubber components contained in the rubber composition.

Examples 2 to 18 and Comparative Examples 4 to 8

Rubber wet masterbatches, rubber compositions, and unvulcanized rubber compositions in Examples 2 to 18 and Comparative Examples 4 to 8 were produced in the same manner as in Example 1 except that in <Step (I): production of carbon black-containing rubber latex aqueous solution> in Example 1, the addition rate (g/min) of the rubber component contained in the rubber latex solution, the addition rate (mmol/min) of the coagulant, and the rate of a part of the coagulant used (% by mass) were changed to the values shown in Table 1 or 2. Tables 1 and 2 show the results for the pH of the carbon black-containing rubber latex aqueous solution and the size (mm) of the carbon black-containing rubber coagulum in Examples and Comparative Examples.

Comparison Example 1

A rubber wet masterbatch, a rubber composition, and an unvulcanized rubber composition in Comparative Example 1 were produced in the same manner as in Example 1 except that in <Step (I): production of carbon black-containing rubber latex aqueous solution> in Example 1, a part of the coagulant was not added. Table 1 shows the results for the pH of the carbon black-containing rubber latex aqueous solution and the size (mm) of the carbon black-containing rubber coagulum in Comparative Examples.

Comparative Example 2

A rubber wet masterbatch, a rubber composition, and an unvulcanized rubber composition in Comparative Example 2 were produced in the same manner as in Example 1 except that in <Step (I): production of carbon black-containing rubber latex aqueous solution> in Example 1, a part of the coagulant was added before the addition of the rubber latex solution. Table 1 shows the results for the pH of the carbon black-containing rubber latex aqueous solution and the size (mm) of the carbon black-containing rubber coagulum in Comparative Examples.

Comparative Example 3

A rubber wet masterbatch, a rubber composition, and an unvulcanized rubber composition in Comparative Example 3 were produced in the same manner as in Example 1 except that in <Step (I): production of carbon black-containing rubber latex aqueous solution> in Example 1, a part of the coagulant was added after the addition of the rubber latex solution. Table 1 shows the results for the pH of the carbon black-containing rubber latex aqueous solution and the size (mm) of the carbon black-containing rubber coagulum in Comparative Examples.

The unvulcanized rubber compositions obtained in Examples and Comparative Examples described above were vulcanized at 150° C. for 30 minutes to produce vulcanized rubber. The obtained vulcanized rubber was evaluated as follows. Tables 1 and 2 show the evaluation results.

<Evaluation of Exothermicity>

For evaluation of exothermicity, measurement was performed using a rheometer E4000 manufactured by UBM under the conditions of a temperature of 60° C., a frequency of 10 Hz, an initial strain of 15%, and a dynamic strain of +2.5%, and the index based on the value in Comparative Example 1 set to 100 was evaluated. The smaller the index is, the better the low exothermicity is.

<Evaluation of Abrasion Resistance>

The abrasion loss of the test piece of the obtained vulcanized rubber was measured in a Lambourn abrasion test (slip ratio: 30%, load: 40 N, sand falling rate: 20 g/min) in accordance with JIS K6264 to evaluate the abrasion resistance. Table 1 shows the index of the reciprocal of the abrasion loss in each Example based on the value in Comparative Example 1 set to 100. The larger the index is, the better the abrasion resistance is.

TABLE 1

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Steps (I) to (III) | Natural rubber (solid content) | Part by mass | 100 | 100 | 100 | 100 | 100 | 100 | 100 |
| | Carbon black (A) | Part by mass | 20 | 20 | 20 | 20 | 20 | 20 | 20 |
| | Carbon black (B) | Part by mass | 20 | 20 | 20 | 20 | 20 | 20 | 20 |
| | Carbon black (C) | Part by mass | — | — | — | — | — | — | — |
| | Carbon black (D) | Part by mass | — | — | — | — | — | — | — |

TABLE 1-continued

|  |  |  | | | | | | | |
|---|---|---|---|---|---|---|---|---|---|
|  | Anti-aging agent (A) | Part by mass | 3 | 3 | 3 | 3 | 3 | 3 | 3 |
|  | Part of coagulant | Rate per all coagulants (% by mass) | 0 | 50 | 50 | 75 | 50 | 50 | 50 |
|  | Time to add part of coagulant |  | Absent | Before addition of rubber latex solution | After completion of addition of rubber latex solution | Simultaneous with rubber latex solution | Simultaneous with rubber latex solution | Simultaneous with rubber latex solution | Simultaneous with rubber latex solution |
|  | Addition rate of part of pore coagulant per 100 g of carbon black (mol/min) |  | — | 40 | 40 | 40 | 5 | 120 | 40 |
|  | Addition rate of rubber component in rubber latex solution per 100 g of carbon black (g/min) |  | 40 | 40 | 40 | 40 | 40 | 40 | 5 |
|  | pH of carbon black-containing rubber latex aqueous solution |  | 8.9 | 7.6 | 7.5 | 6.5 | 7.5 | 7.6 | 7.5 |
|  | Size of carbon black-containing rubber coagulum (nm) |  | 70 | 7.5 | 50 | 9 | 70 | 8 | 9 |
| Step (IV) | Zinc oxide | Part by mass | 3 | 3 | 3 | 3 | 3 | 3 | 3 |
|  | Stearic acid | Part by mass | 2 | 2 | 2 | 2 | 2 | 2 | 2 |
|  | Anti-aging agent (A) | Part by mass | 2 | 2 | 2 | 2 | 2 | 2 | 2 |
|  | Anti-aging agent (B) | Part by mass | 1 | 1 | 1 | 1 | 1 | 1 | 1 |
|  | Sulfur | Part by mass | 2 | 2 | 2 | 2 | 2 | 2 | 2 |
|  | Vulcanization accelerator (A) | Part by mass | 1.5 | 1.5 | 1.5 | 1.5 | 1.5 | 1.5 | 1.5 |
|  | Vulcanization accelerator (B) | Part by mass | 0.5 | 0.5 | 0.5 | 0.5 | 0.5 | 0.5 | 0.5 |
| Evaluation | Exothernicity |  | 100 | 98 | 99 | 100 | 98 | 99 | 99 |
|  | Abrasion resistance |  | 100 | 100 | 100 | 100 | 100 | 99 | 100 |

|  |  |  | Comparative Example 8 | Example 1 | Example 2 | Example 3 | Example 4 | Example 5 | Example 6 |
|---|---|---|---|---|---|---|---|---|---|
| Steps (I) to (III) | Natural rubber (solid content) | Part by mass | 100 | 100 | 100 | 100 | 100 | 100 | 100 |
|  | Carbon black (A) | Part by mass | 20 | 20 | 20 | 20 | 20 | 20 | 20 |
|  | Carbon black (B) | Part by mass | 20 | 20 | 20 | 20 | 20 | 20 | 20 |
|  | Carbon black (C) | Part by mass | — | — | — | — | — | — | — |
|  | Carbon black (D) | Part by mass | — | — | — | — | — | — | — |
|  | Anti-aging agent (A) | Part by mass | 3 | 3 | 3 | 3 | 3 | 3 | 3 |
|  | Part of coagulant | Rate per all coagulants (% by mass) | 50 | 50 | 25 | 50 | 50 | 50 | 50 |
|  | Time to add part of coagulant |  | Simultaneous with rubber latex solution | Simultaneous with rubber latex solution | Simultaneous with rubber latex solution | Simultaneous with rubber latex solution | Simultaneous with rubber latex solution | Simultaneous with rubber latex solution | Simultaneous with rubber latex solution |
|  | Addition rate of part of pore coagulant per 100 g of carbon black (mol/min) |  | 40 | 40 | 40 | 35 | 65 | 40 | 40 |
|  | Addition rate of rubber component in rubber latex solution per 100 g of carbon black (g/min) |  | 120 | 40 | 40 | 40 | 40 | 60 | 30 |
|  | pH of carbon black-containing rubber latex aqueous solution |  | 7.5 | 7.7 | 8.1 | 7.8 | 7.8 | 7.6 | 7.7 |
|  | Size of carbon black-containing rubber coagulum (nm) |  | 70 | 30 | 36 | 26 | 36 | 38 | 23 |
| Step (IV) | Zinc oxide | Part by mass | 3 | 3 | 3 | 3 | 3 | 3 | 3 |
|  | Stearic acid | Part by mass | 2 | 2 | 2 | 2 | 2 | 2 | 2 |
|  | Anti-aging agent (A) | Part by mass | 2 | 2 | 2 | 2 | 2 | 2 | 2 |
|  | Anti-aging agent (B) | Part by mass | 1 | 1 | 1 | 1 | 1 | 1 | 1 |
|  | Sulfur | Part by mass | 2 | 2 | 2 | 2 | 2 | 2 | 2 |
|  | Vulcanization accelerator (A) | Part by mass | 1.5 | 1.5 | 1.5 | 1.5 | 1.5 | 1.5 | 1.5 |
|  | Vulcanization accelerator (B) | Part by mass | 0.5 | 0.5 | 0.5 | 0.5 | 0.5 | 0.5 | 0.5 |
| Evaluation | Exothernicity |  | 98 | 97 | 97 | 97 | 98 | 97 | 96 |
|  | Abrasion resistance |  | 99 | 102 | 102 | 101 | 102 | 102 | 101 |

TABLE 2

| | | | Example 7 | Example 8 | Example 9 | Example 10 | Example 11 | Example 12 |
|---|---|---|---|---|---|---|---|---|
| Steps (I) to (III) | Natural rubber (solid content) | Part by mass | 100 | 100 | 100 | 100 | 100 | 100 |
| | Carbon black (A) | Part by mass | — | — | — | — | — | — |
| | Carbon black (B) | Part by mass | 20 | 20 | 20 | 20 | 20 | 20 |
| | Carbon black (C) | Part by mass | 20 | 20 | 20 | 20 | 20 | 20 |
| | Carbon black (D) | Part by mass | — | — | — | — | — | — |
| | Anti-aging agent (A) | Part by mass | 3 | 3 | 3 | 3 | 3 | 3 |
| | Part of coagulant | Rate per all coagulants (% by mass) | 50 | 25 | 50 | 50 | 50 | 50 |
| | | Time to add part of coagulant | Simultaneous with rubber latex solution | Simultaneous with rubber latex solution | Simultaneous with rubber latex solution | Simultaneous with rubber latex solution | Simultaneous with rubber latex solution | Simultaneous with rubber latex solution |
| | Addition rate of part of pore coagulant per 100 g of carbon black (mol/min) | | 40 | 40 | 30 | 65 | 40 | 40 |
| | Addition rate of rubber component in rubber latex solution per 100 g of carbon black (g/min) | | 40 | 40 | 40 | 40 | 60 | 30 |
| | pH of carbon black-containing rubber latex aqueous solution | | 7.7 | 8.2 | 7.6 | 7.8 | 7.7 | 7.8 |
| | Size of carbon black-containing rubber coagulum (nm) | | 31 | 35 | 27 | 36 | 32 | 22 |
| Step (IV) | Zinc oxide | Part by mass | 3 | 3 | 3 | 3 | 3 | 3 |
| | Stearic acid | Part by mass | 2 | 2 | 2 | 2 | 2 | 2 |
| | Anti-aging agent (A) | Part by mass | 2 | 2 | 2 | 2 | 2 | 2 |
| | Anti-aging agent (B) | Part by mass | 1 | 1 | 1 | 1 | 1 | 1 |
| | Sulfur | Part by mass | 2 | 2 | 2 | 2 | 2 | 2 |
| | Vulcanization accelerator (A) | Part by mass | 1.5 | 1.5 | 1.5 | 1.5 | 1.5 | 1.5 |
| | Vulcanization accelerator (B) | Part by mass | 0.5 | 0.5 | 0.5 | 0.5 | 0.5 | 0.5 |
| Evaluation | Exothernicity | | 99 | 98 | 98 | 98 | 99 | 99 |
| | Abrasion resistance | | 103 | 103 | 102 | 102 | 102 | 103 |

| | | | Example 13 | Example 14 | Example 15 | Example 16 | Example 17 | Example 18 |
|---|---|---|---|---|---|---|---|---|
| Steps (I) to (III) | Natural rubber (solid content) | Part by mass | 100 | 100 | 100 | 100 | 100 | 100 |
| | Carbon black (A) | Part by mass | — | — | — | — | — | — |
| | Carbon black (B) | Part by mass | 20 | 20 | 20 | 20 | 20 | 20 |
| | Carbon black (C) | Part by mass | — | — | — | — | — | — |
| | Carbon black (D) | Part by mass | 20 | 20 | 20 | 20 | 20 | 20 |
| | Anti-aging agent (A) | Part by mass | 3 | 3 | 3 | 3 | 3 | 3 |
| | Part of coagulant | Rate per all coagulants (% by mass) | 50 | 25 | 50 | 50 | 50 | 50 |
| | | Time to add part of coagulant | Simultaneous with rubber latex solution | Simultaneous with rubber latex solution | Simultaneous with rubber latex solution | Simultaneous with rubber latex solution | Simultaneous with rubber latex solution | Simultaneous with rubber latex solution |
| | Addition rate of part of pore coagulant per 100 g of carbon black (mol/min) | | 40 | 40 | 30 | 65 | 40 | 40 |
| | Addition rate of rubber component in rubber latex solution per 100 g of carbon black (g/min) | | 40 | 40 | 40 | 40 | 60 | 30 |
| | pH of carbon black-containing rubber latex aqueous solution | | 7.7 | 8.1 | 7.7 | 7.7 | 7.7 | 7.6 |
| | Size of carbon black-containing rubber coagulum (nm) | | 32 | 35 | 28 | 33 | 37 | 25 |
| Step (IV) | Zinc oxide | Part by mass | 3 | 3 | 3 | 3 | 3 | 3 |
| | Stearic acid | Part by mass | 2 | 2 | 2 | 2 | 2 | 2 |
| | Anti-aging agent (A) | Part by mass | 2 | 2 | 2 | 2 | 2 | 2 |
| | Anti-aging agent (B) | Part by mass | 1 | 1 | 1 | 1 | 1 | 1 |
| | Sulfur | Part by mass | 2 | 2 | 2 | 2 | 2 | 2 |
| | Vulcanization accelerator (A) | Part by mass | 1.5 | 1.5 | 1.5 | 1.5 | 1.5 | 1.5 |

TABLE 2-continued

|  |  |  |  |  |  |  |  |  |
|---|---|---|---|---|---|---|---|---|
|  | Vulcanization accelerator (B) | Part by mass | 0.5 | 0.5 | 0.5 | 0.5 | 0.5 | 0.5 |
| Evaluation | Exothermicity |  | 97 | 97 | 98 | 97 | 97 | 98 |
|  | Abrasion resistance |  | 101 | 101 | 102 | 102 | 101 | 101 |

What is claimed is:

1. A method for producing a rubber wet masterbatch, the method comprising:
   a step (I) of mixing a rubber latex solution and a part of a coagulant with a carbon black-containing slurry aqueous solution in which a carbon black is dispersed in water, while the rubber latex solution and the part of the coagulant are added to the carbon black-containing slurry aqueous solution, to produce a carbon black-containing rubber latex aqueous solution having a pH of 7 or more and 8.5 or less;
   a step (II) of adding a remaining part of the coagulant to the carbon black-containing rubber latex aqueous solution obtained to produce a carbon black-containing rubber coagulum; and
   a step (III) of dehydrating and drying the carbon black-containing rubber coagulum obtained to produce a rubber wet masterbatch,
   wherein in the step (I), a rubber component contained in the rubber latex solution is added at an addition rate of 10 g/min or more and 100 g/min or less and the part of the coagulant is added at an addition rate of 10 mmol/min or more and 100 mmol/min or less per 100 g of the carbon black contained in the carbon black-containing slurry aqueous solution.

2. A method for producing a rubber composition, the method comprising a step (IV) of dry mixing in which the rubber wet masterbatch obtained by the method for producing a rubber wet masterbatch according to claim 1 is used.

* * * * *